(12) United States Patent
Baldo et al.

(10) Patent No.: US 12,598,676 B2
(45) Date of Patent: Apr. 7, 2026

(54) COOKING ARTICLE DETECTION SYSTEM WITH DIFFERENTIAL DETECTION COILS

(71) Applicant: WHIRLPOOL CORPORATION, Benton Harbor, MI (US)

(72) Inventors: Salvatore Baldo, Varese (IT); Mario Barbati, Sulmona (IT); Andrea Gallivanoni, Sempione (IT); Silvio Sperone, Tortora (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 1112 days.

(21) Appl. No.: 17/560,355

(22) Filed: Dec. 23, 2021

(65) Prior Publication Data

US 2023/0209665 A1 Jun. 29, 2023

(51) Int. Cl.
*H05B 6/06* (2006.01)
*H05B 6/12* (2006.01)

(52) U.S. Cl.
CPC ........... *H05B 6/065* (2013.01); *H05B 6/1272* (2013.01); *H05B 2213/05* (2013.01)

(58) Field of Classification Search
CPC ....................... H05B 2213/03; H05B 2213/05; H05B 6/062; H05B 6/065; H05B 6/1272
USPC .......................................................... 219/622
See application file for complete search history.

(56) References Cited

U.S. PATENT DOCUMENTS 4,447,691 A * 5/1984 Mizukawa ............. H05B 6/062 219/622
5,136,277 A 8/1992 Civanelli et al.
6,642,711 B2 11/2003 Kawate et al.
8,569,666 B2 10/2013 Gutierrez et al.
9,936,539 B2 4/2018 Sakatani et al.
10,009,960 B2 6/2018 Artal Lahoz et al.
2016/0029438 A1 1/2016 Sakatani et al.
(Continued)

FOREIGN PATENT DOCUMENTS

DE 102006043182 A1 4/2007
EP 2312908 A1 4/2011
EP 2312908 B1 8/2017
(Continued)

*Primary Examiner* — Ibrahime A Abraham
*Assistant Examiner* — Joseph W Iskra
(74) *Attorney, Agent, or Firm* — Price Heneveld, LLP

(57) ABSTRACT

A cooking article detection system for an induction cooktop having a first power-delivery induction coil includes a first detector coil overlying the first power-delivery induction coil and including a first conductive element revolving continuously around a centroid in a first tangential direction to define a shape of the first coil that extends in a first linear direction and a second linear direction along a plane and a second detector coil overlying the first power-delivery coil and including a second conductive element connected with the first detector coils and revolving continuously around a centroid in a second tangential direction, opposite the first tangential direction. The second detector coil is linearly arranged with the first detector coil and is spaced apart therefrom in the second linear direction. A controller drives the first and second detection coils, simultaneously, with a low-voltage, high frequency detection signal, and measures a voltage across the first and second detection coils to identify a cooking article on the induction cooktop.

17 Claims, 6 Drawing Sheets

(56) References Cited

U.S. PATENT DOCUMENTS

2022/0007470 A1* 1/2022 Carretero Chamarro .................... G01K 7/22

FOREIGN PATENT DOCUMENTS

| | | | |
|---|---|---|---|
| JP | 5106201 | B2 | 12/2012 |
| WO | 2020079625 | A1 | 4/2020 |

* cited by examiner

COOKING ARTICLE DETECTION SYSTEM WITH DIFFERENTIAL DETECTION COILS

BACKGROUND OF THE DISCLOSURE

The present disclosure generally relates to a cooking article detection system for an induction cooktop, and more specifically, to a detection system utilizing an array of detection coils connected in differential pairs.

In cooktops using induction technology, the ability of the cooktop to correctly detect cookware items above the various cooking zones or otherwise over power-delivery coils can be an important factor in operation and overall performance. In traditional induction cooktops, cooking article detection is typically performed by stimulating the cookware item with a large electromagnetic field generated by the power-delivery coils. The system response to the generated field is analyzed to obtain either instantaneous information about the presence or absence of a cooking article above each of the coils or continuous information about the coverage factor of the cookware item with respect to the coil. This high-energy stimulus involves the generation of an audible clicking noise from the cooking article and provides only limited information regarding the particular location of cooking articles.

SUMMARY OF THE DISCLOSURE

According to one aspect of the present disclosure, a cooking article detection system for an induction cooktop having a first power-delivery induction coil includes a first detector coil overlying the first power-delivery induction coil and including a conductive element revolving continuously around a centroid in a first tangential direction to define a shape of the first coil that extends in a first linear direction and a second linear direction along a plane and a second detector coil overlying the first power-delivery induction coil and including a second conductive element revolving continuously around a centroid in a second tangential direction, opposite the first tangential direction, to define a shape of the second coil that extends in the first direction and the second direction along the plane. The second detector coil is linearly arranged with the first detector coil and is spaced apart therefrom in the second linear direction. The system further includes a controller driving the first and second detection coils, simultaneously, with a low-voltage, high frequency detection signal, and measuring a voltage across the first and second detection coils to identify a cooking article on the induction cooktop over the first power-delivery induction coil by the voltage being below a predetermined threshold value.

According to another aspect of the present disclosure, an induction cooktop includes a first power-delivery induction coil, a first detector coil overlying the first power-delivery induction coil and including a first conductive element revolving continuously around a centroid in a first tangential direction to define a shape of the first coil that extends in a first linear direction and a second linear direction along a plane, and a second detector coil overlying the first power-delivery induction coil and including a second conductive element revolving continuously around a support in a second tangential direction, opposite the first tangential direction, to define a shape of the second coil that extends in the first direction and the second direction along the plane. The second detector coil is linearly arranged with the first detector coil and spaced apart therefrom in the second linear direction. The cooktop further includes a controller driving the first and second detection coils, simultaneously, with a low-voltage, high frequency detection signal, and measuring a voltage across the first and second detection coils to identify a cooking article on the induction cooktop over the first power-delivery induction coil by the voltage being below a predetermined threshold value.

According to yet another aspect of the present disclosure, a method for detecting a cooking article in place on an induction cooktop having a first power-delivery induction coil including driving a first detection coil and second detection coils, simultaneously, with a low-voltage, high frequency detection signal. The first detector coil overlies the first power-delivery induction coil and includes a first conductive element revolving continuously around a centroid in a first tangential direction to define a shape of the first coil that extends in a first linear direction and a second linear direction along a plane. The second detector coil overlies the first power-delivery induction coil and includes a second conductive element revolving continuously around a support in a second tangential direction, opposite the first tangential direction, to define a shape of the second coil that extends in the first direction and the second direction along the plane. The detector is linearly arranged with the first detector coil and spaced apart therefrom in the second linear direction. The method further includes measuring a voltage across the first and second detection coils, to identify a cooking article on the induction cooktop over the first power-delivery induction coil by the voltage being below a predetermined threshold value.

These and other features, advantages, and objects of the present disclosure will be further understood and appreciated by those skilled in the art by reference to the following specification, claims, and appended drawings.

Figure 1:
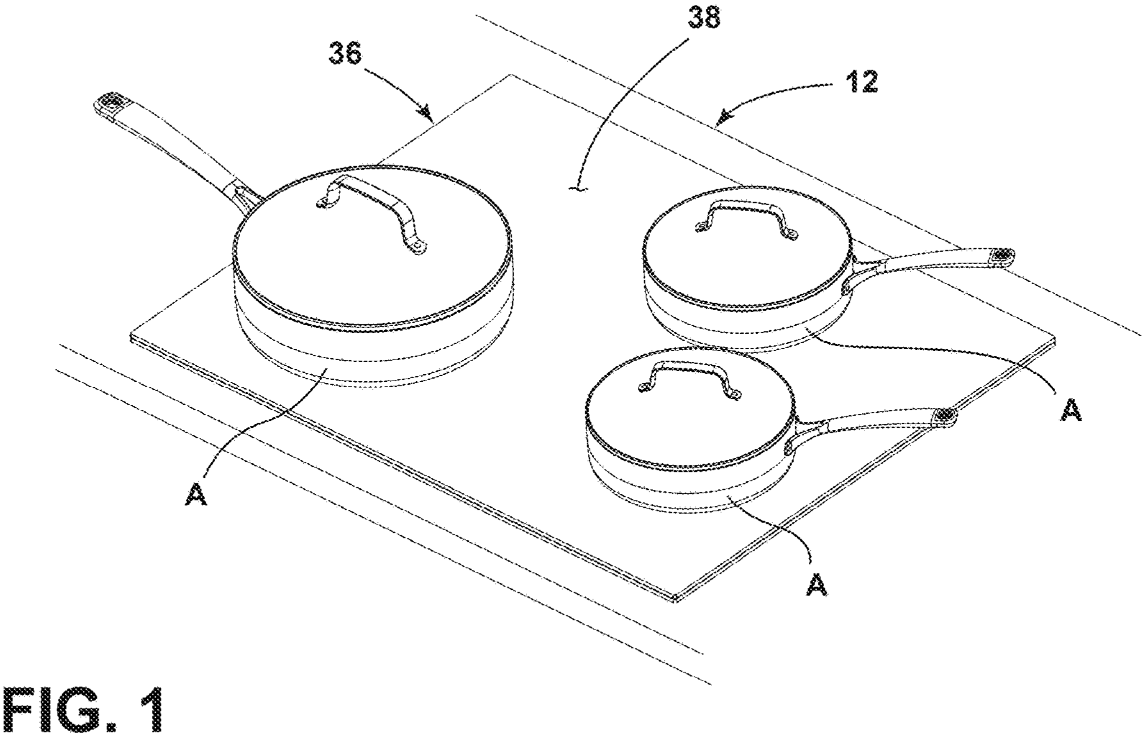
FIG. 1 is a perspective view of an induction cooktop with a plurality of cooking articles placed thereon.

The components in the figures are not necessarily to scale, emphasis instead being placed upon illustrating the principles described herein.

DETAILED DESCRIPTION

The present illustrated embodiments reside primarily in combinations of method steps and apparatus components related to a cooking article detection system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms “upper,” “lower,” “right,” “left,” “rear,” “front,” “vertical,” “horizontal,” and derivatives thereof shall relate to the disclosure as oriented in FIG. 1. Unless stated otherwise, the term “front” shall refer to the surface of the element closer to an intended viewer, and the term “rear” shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms “including,” “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises a . . . ” does not, without more constraints, preclude the existence of additional identical elements in the process, method, article, or apparatus that comprises the element.

Figure 2:
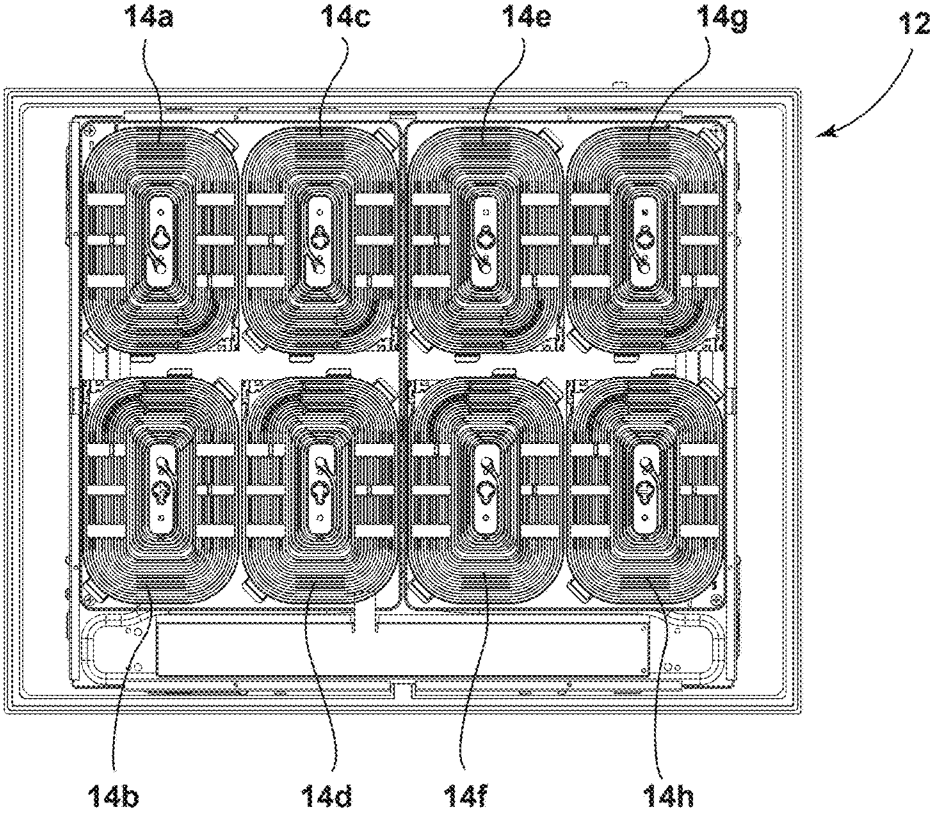
FIG. 2 is an internal view of the cooktop showing a possible arrangement of induction coils for delivery of heating power to one or more of the various cooking articles placed on the cooktop.
Figure 3:
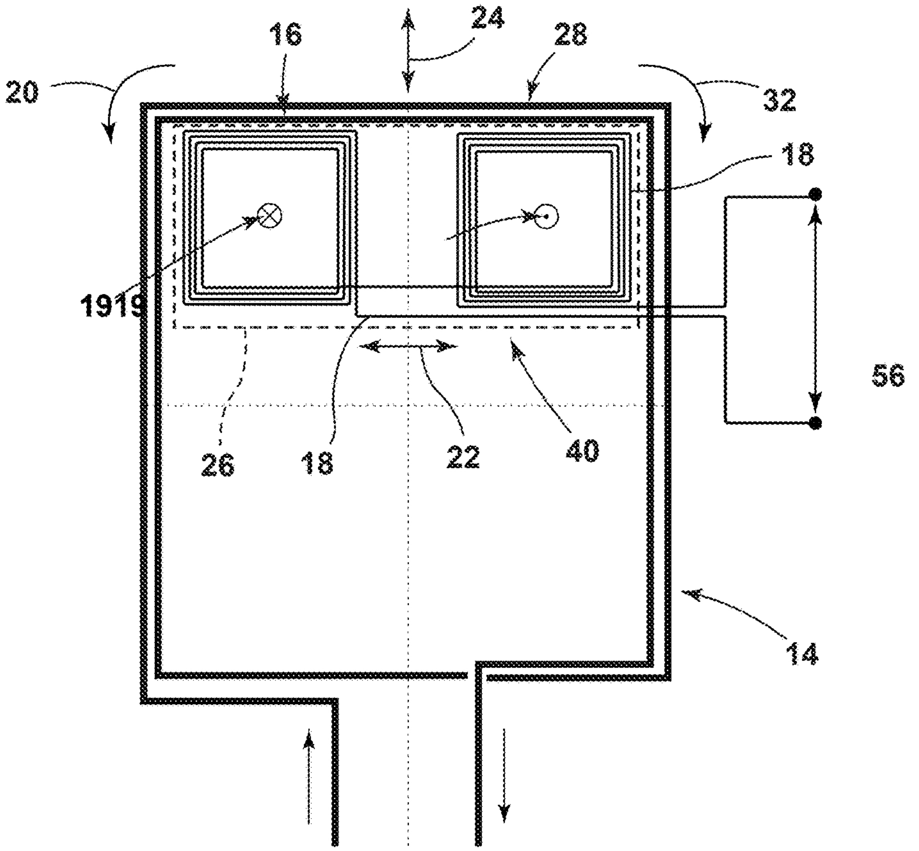
FIG. 3 is a schematic representation of a detector including detector coils associated with a portion of a power-delivery induction coil useable in the cooktop of FIGS. 1 and 2.
Figure 4:
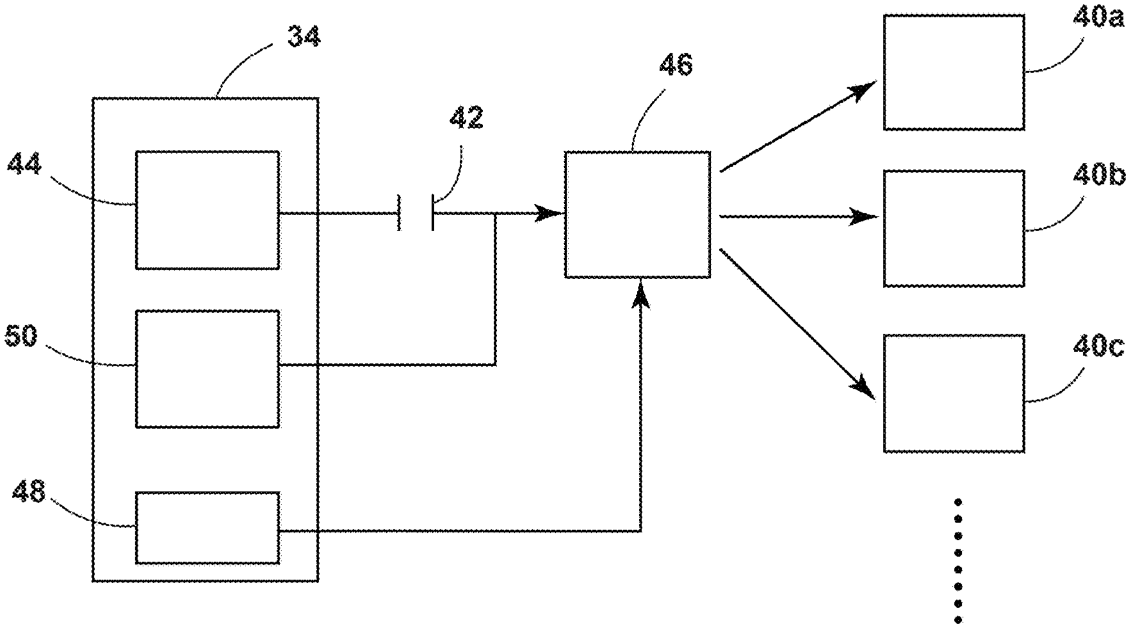
FIG. 4 is a schematic diagram of a detection system using the detector including detector coils shown in FIG. 3.

Referring to FIGS. 1-7, reference numeral 10 generally designates a cooking article detection system, as particularly shown schematically in FIG. 4. In one aspect, the cooking article detection system 10 is configured for use in connection with an induction cooktop 12 having a first power-delivery induction coil 14. The system 10 includes a first detector coil 16 overlying the first power-delivery induction coil 14 and including a first conductive element 18 revolving continuously in a first tangential direction 20 around a centroid 19 to define a shape of the first detector coil 16 that extends in a first linear direction 22 and a second linear direction 24 along a plane 26 and a second detector coil 28 operating together with the first detector coil 14 as a single detector 40 and overlying the first power-delivery induction coil 14 and including a second conductive element 30 revolving continuously in a second tangential direction 32, opposite the first tangential direction 20, to define a shape of the second detector coil 28 that extends in the first direction 22 and the second direction 24 along the plane 26. The second detector coil 28 is linearly arranged with and electrically connected in series with the first detector coil 16 and is spaced apart therefrom in the second linear direction 24. The system 10 further includes a controller 34 driving the first and second detector coils 16 and 28, simultaneously, with a low-voltage, high frequency detection signal, and measuring a voltage V across the first and second detection coils 16 and 28 to identify a cooking article A on the induction cooktop 12 over the first power-delivery induction coil 14 by the voltage being below a predetermined threshold value Vo.

With reference to FIGS. 1 and 2, an example of the induction cooktop 12 with which the present system 10 is useable can include a number of power-delivery induction coils 14*a*-14*h* in an array below a cooktop substrate 36 having a major surface 38 parallel to the plane 26 and overlying the first power-delivery induction coil 14, the first detection coil 16, and the second detection coil 28. In an example, the cooktop substrate 36 can be of a glass-ceramic material of various known compositions for closed, electric cooktops and for induction cooktops in particular. The cooktop 12 according to the present disclosure can be a stand-alone unit (e.g., a cooking hob appliance) or included with an oven (such as a conventionally-heated electric oven) in a range appliance. In any such arrangement, the system 10 can be useable to detect the presence of a cooking article, such as the cooking articles $A_1$, $A_2$, and $A_3$ shown in FIG. 1, when resting on the major surface 38, which is depicted as the upper supporting surface of the cooktop substrate 36. In a particular aspect, the controller 34, in identifying the cooking article A on the induction cooktop 12 over the first power-delivery induction coil 14 may include identifying the cooking article A when resting on the cooktop substrate 36 and positioned vertically over the first power-delivery induction coil 14.

As can be appreciated, the nature of the depicted induction cooktop 12, and of induction cooktops in general, is such that it is particularly desirable to determine when a cooking article A is present over a power-delivery coil 14. By way of example, the present induction cooktop 12 is configured such that the array of multiple power-delivery coils 14*a*-14*h* span substantially all of a predetermined useable area of the cooktop substrate 36, thereby allowing individual or multiple ones of the power-delivery coils 14 to be used alone or in combination to provide inductive heating to one or more cooking articles A, such as the depicted cooking articles $A_1$-$A_3$, shown in FIG. 1, that either by their size or position extend over more than one such power-delivery coils 14*a*-14*h*. In this manner, an induction cooktop 12 can operate to provide heating of cooking articles A identified on the cooktop substrate 36 using the appropriate power-delivery coils 14 without the user having to select or operate the power-delivery coils 14 individually. In further aspects, the induction cooktop 12 may implement various calibration or optimization processes that can consider the particular placement of the cooking articles A to be heated with respect to the one or more power-delivery coils 14 that may additionally utilize the detection capability of the system 10 described herein. In this manner, and as discussed further below, the present system 10 can be configured to detect both the presence of one or more cooking articles A over each of the power-delivery coils 14 and over a particular portion of each of the power-delivery coils 14 present in the particular induction cooktop 12 in which the system 10 is included.

In general, the present system 10 includes a matrix of detectors 40 of the first detector coils 16 and the second detector coils 28 associated with the power-delivery induction coils 14, in various specific arrangements, with each detector 40 used to detect the presence of a cooking article with respect to the area of the cooktop substrate 36 that overlies the detector 40 of the first detector coils 16. As mentioned above, the respective first and second detector coils 16 and 28 in each detector 40 are revolving continuously in opposite first and second tangential directions 20 and 32 such that the detector are operated together in a differential mode. In the example shown in FIG. 3, the first detector coil 16 is revolving continuously such that the first tangential direction 20 is anti-clockwise and the second detector coil 28 is revolving continuously such that the second tangential direction 32 is clockwise, although the opposite arrangement may also be utilized. In this manner, the field induced by providing a voltage across each of the first and second detector coils 16 and 28 have opposite orientations. In one implementation, the conductive element can be a single filament of wire and, as described herein, the first and second detector coils 16 and 28 can be formed of such single wire filament by revolving continuously around the centroid 19 of each coil 16 and 28 thereof. In general, the description as being wound refers to the construction of the first and second detector coils 16 and 28 being of a single length of wire 18, such as a single strand of wire, repeatedly looped or circulated over and around itself a number of times (e.g., at least 50 or at least 100 or more times) to build up a larger structure that defines the overall shape of the first and second detection coils 16 and 18 in a manner similar to, but generally smaller than the power-delivery induction coils 14 and as may be generally understood in the art and such that the resulting coils 16 and 28 can generate the desired magnetic field having the appropriate characteristics under the application of a desired signal. In this manner, the first and second detection coils 16 and 28 may be fabricated by winding in the same direction but can be placed such that the resulting structure is oriented in opposite directions, as shown in the figures. The wire 18 of detection coils 16 and 28 can be wound around a dielectric support structure or can be self-supporting. As can be appreciated, the actual first and second detector coils 16 and 28 will include a much greater number of loops than shown in the schematic depiction in FIG. 3, which has been simplified to more clearly show the relative directions of the detection coils 16 and 28, as well as the example power-delivery induction coil 14. As mentioned above, the first and second conductive elements 18 ad 30 can be electrically connected, such as by formation of a single wire or by connection together in series by an additional conductive element. In other implementations, the conducive elements 18 and 30 can be a single trace, formed by deposition, screen printing, or the like, on a dielectric element, such as a circuit board or the like, similarly revolving continuously around a centroid in a spiral form defining the coil, with other implementations being possible.

As shown in FIG. 4, detectors of the first and second detector coils 16 and 28 are arranged as single detectors 40 and included in electronic circuitry within the cooktop 12, with three such detectors 40*a*, 40*b*, and 40*c* being shown in the schematic example of FIG. 4. More specifically the electronic circuitry associated with the detectors 40 including detector coils 16 and 28 is structured as a RLC resonant network. As generally understood, an RLC network consists of a resistor, a capacitor 42 and an inductor. In the present application, the inductance (L) of the system is generally provided by the detector coils 16 and 28, with the particular value of the inductance changing in the presence or absence of a cooking article near (e.g. over so as to be within the magnetic field induced in) either or both of the detector coils 16 and 28, as well as with the particular properties of the cooking article. Additionally, by using the controller 34 to drive the detector coils 16 and 28 using an alternating, high-frequency signal (e.g. on the order of about 1 MHz), the use of a high-frequency alternating signal causes the detector coils 16 and 28 to also function as the resistor (R) in the RLC resonant network due to the increased resistance within the conductive elements 18 that is produced by the high-frequency alternation of the current as a result of the skin effect. Because the change in resistance of the conductive element 18 in the detector coils 16 and 28 is caused by a magnetic field induced in the core of the conductive element 18, the addition of a cooking article A to the equivalent series model of the RLC resonant network (i.e., by absorbing a large portion of the magnetic field produced by the detector coils 16 and 28) will result in a different resistance (R) of the RLC resonant network than if no cooking article A is present. Because the capacitance is known and fixed, by the inclusion of a particular capacitor 42, the change in the values of the inductance (L) and resistance (R) causes a measurable voltage variation across the detector coils 16 and 28 and output by the RLC resonant network, as a result. Additionally, the high frequency signal is sufficient to induce the desired change in resistance over the detection coils 16 and 28, even at a low voltage (e.g., having a maximum value of less than 10 V and in one example of 5V) the detector coils 16 and 28 can be used to detect a cooking article A over the first power-delivery coil 14, for example, without the characteristic loud clicking noise caused by using the high-voltage detection signal of a power-delivery coil 14 for detection.

In the example depicted in FIG. 4, a single source 44 of the alternating high-frequency signal of 1 MHz, pulse-width modulated ("PWM") is shown. The signal source 44 is included in the controller 34. As shown, the system 10 also includes a multiplexer 46 that is connected between the controller 34 and each of the detectors 40*a*, 40*b*, 40*c* including detector coils 16 and 28 included in the system 10. The multiplexer 46 is configured to selectively, or alternately, connect any one of the detectors 40*a*, 40*b*, and 40*c* of detection coils 16 and 28 and the controller 34 such that the signal source 44 within the controller 34 can drive the connected detector 40*a*, 40*b*, or 40*c* of detection coils 16 and 28 with the above-described detection signal. As shown, the controller 34 connects directly with the multiplexer 46 by way of an input-output interface 48 that allows the controller 34 to direct the connection to a desired detector 40*a*, 40*b*, or 40*c* of detection coils 16 and 28. In this manner, the controller 34 can be programmed or otherwise configured to select, for a desired time interval, which of the detectors 40*a*, 40*b*, or 40*c* of detection coils 16 and 28 is connected into the resonant network such that the controller 34 is aware of the particular detector 40*a*, 40*b*, 40*c* with which it is receiving a voltage reading. By correlating the respective detectors 40*a*, 40*b*, and 40*c* of detection coils 16 and 28 with the known locations thereof, the controller 34 can associate a positive or negative detection with the particular power-delivery coil 14 and/or area of the cooktop 12. As can be appreciated, the voltage over the resonant network is determined by a measurement provision (ADC) 50 also included within the controller 34 for coordination of the selection of and measurement from the desired detector 40*a*, 40*b*, or 40*c* of detection coils 16 and 28. In this respect it is noted that the present controller 34 can be a microprocessor executing routines stored in memory associated therewith. In further implementations, the controller 18 can be an application-specific integrated circuit ("ASIC"), system-on-chip, or other known devices and architectures. The controller 34 can be a microprocessor configured for controlling operation of the induction cooktop 12, including operation of the power delivery coils 14, or can be specifically dedicated to the detector 40 or the matrix of detectors 40 included with the induction cooktop 12.

Figure 5:
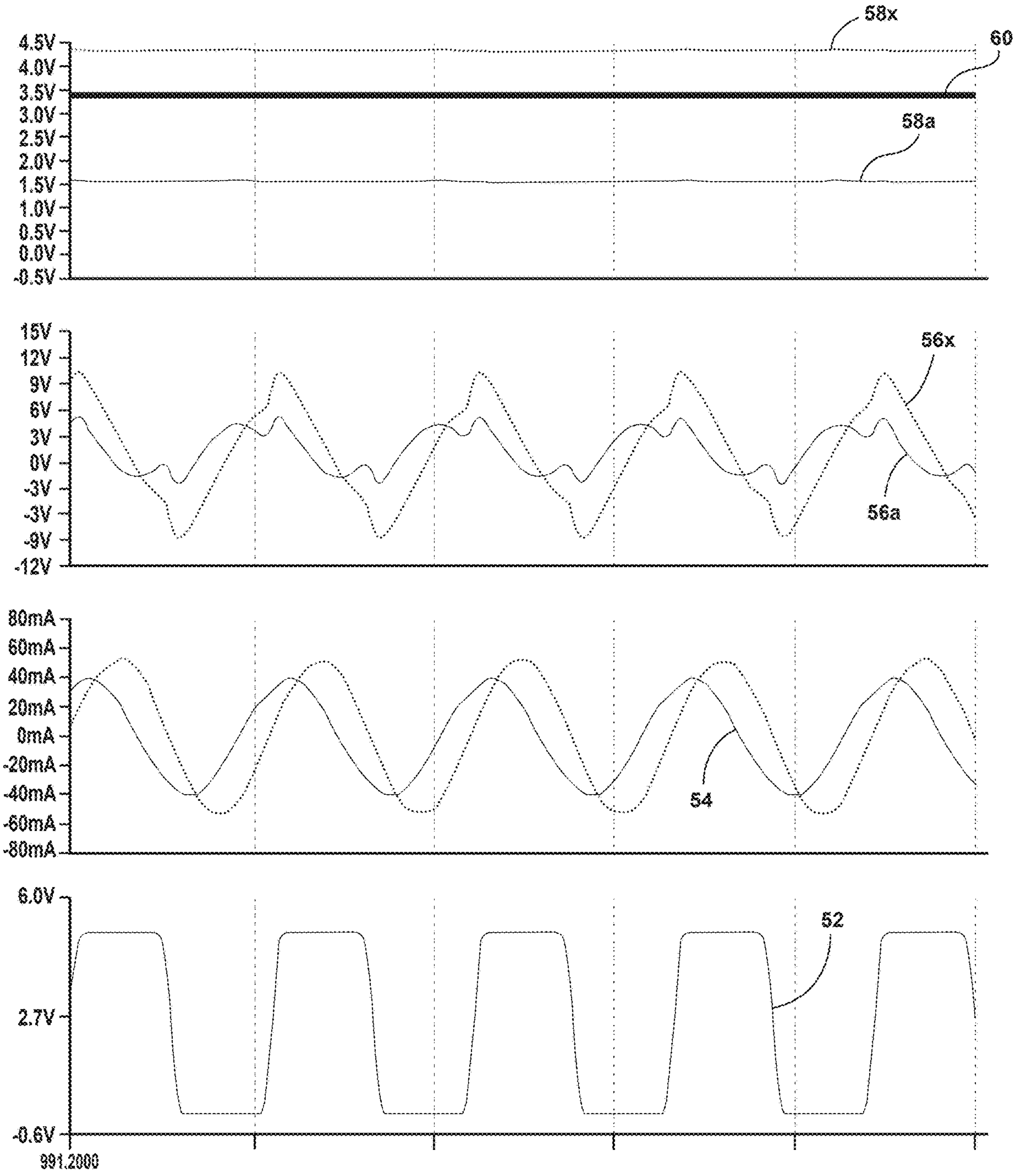
FIG. 5 is a representation of input and output measurements used by the system of FIG. 4 to determine the presence or absence of cooking articles over the detection coils included therein.

FIG. 5 shows example results of the operation of the system 10. In particular, a plot of example behavior of one detector 40 of detection coils 16 and 28 is shown in connection with an example detection signal 52 provided by the signal source 44 of controller 34. In particular, it is possible to see low values of the 1 MHz current 54 circulating in the first and second detector coils 16 and 28 during the detection process (on the order of mA). It is this low current value that contributes to the lack of noise generated within any present cooking article A during detection. FIG. 5 additionally shows, the output voltage received by the ADC 50 of controller 34 (i.e., the voltage measured across the detector 40 of detection coils 16 and 28). More particularly, the output voltage is shown in two different conditions, one in which the output voltage 56*x* represents a condition where no cooking article A is present over the detection coils 16 and 28 and another where the output voltage 56*a*, where a cooking article A is present. Additionally, the result of filtering the raw output voltages 56*x* and 56*a* (e.g. via a low-pass filter included within controller 34) are shown by 58*x* and 58*a*, respectively. The plots of the filtered output voltages 58*x* and 58*a* show the difference in the voltages in the system 10 in the two related situations. This difference, which in the illustrated example is about 3 V (where the filtered output voltage 58*x* in the absence of a cooking article A is about 4.3 V and the filtered output voltage 58*a* in the presence of a cooking article A is about 1.5 V, with other systems 10 producing different values that can be similarly utilized) such that a threshold voltage 60 can be set for the controller 34 to utilize to distinguish between the presence and absence of a cooking article A over the detector 40 of detection coils 16 and 28. In the present example, the threshold voltage 60 can be set at about 3.3 V, although different implementations of the system 10 with, for example, different composition and configurations of the detector coils 16 and 28 and/or different capacitors 42 among other factors, can result in different values for the threshold voltage 60 being useful.

Using the threshold voltage 60, the variation in the voltage across the detectors 40 of detection coils 16 and 28 resulting from the varying resistance (R) and inductance (L) values for the resonant circuit in the presence and absence of a cooking article A over the associated power-delivery coils 14, when driven by the detection signal 52, the controller 34 can determine the presence or absence of the cooking article A. In particular, as discussed above, the presence or absence of a cooking article A on the cooktop substrate 36 over one of the detectors 40 of detection coils 16 and 28 causes variation of the voltage across the detection coils 16 and 28 to a value below the threshold voltage 60 when the cooking article A is present on the induction cooktop 12 over at least one of the detection coils 16 or 28 and to a value above the threshold 60 when the cooking article A is absent from the induction cooktop 12 over either of the detection coils 16 and 28. In this manner, the controller 34 can drive the detector of detection coils 16 and 28, using the signal source 44, while measuring the voltage across the selected detector 40 of detection coils 16 and 28 to identify a cooking article A on the induction cooktop 12 over the detector 40 of detection coils 16 and 28 by the voltage being below the predetermined threshold value 60.

Notably, the above-described differential arrangement of the detector coils 16 and 28 allows the controller 34 to use the detector coils 16 and 28 to determine the presence or absence of a cooking article A on the cooktop 12 over the detector 40 during operation of the associated power-delivery induction coil 14, in addition to when the power-delivery induction coil 14 is not in use. More particularly, by arranging the detector coils 16 and 28 in the above-described detectors 40, revolving continuously in opposite tangential directions 20 and 32, respectively, and connected in series (as shown in FIG. 3), the detector 40 including detector coils 16 and 28 is unaffected by external electromagnetic noise. Accordingly, any external disturbance signal that encounters both detector coils 16 and 28, such as the electromagnetic field of the associated power-delivery induction coil 14, will generate an equal and opposite current in each of the respective detector coils 16 and 28 that will, therefore, have a mutually-canceling effect. Accordingly, cooking article detection, as described above, can be performed even during power-delivery, without adversely affecting the ability of the system 10 to detect the cooking article A. In the schematic representation of FIG. 3, for example, the power-delivery induction coil 14 will emit an electromagnetic field, when powered, that is approximately symmetric across its cross section. The two detector coils 16 and 28 will be influenced by electromagnetic fields that are of the same direction and phase, and approximately the same magnitude. Because of the opposite tangential directions 22 and 32 in which the respective detector coils 16 and 28 are revolving continuously, the resulting current will be in opposite directions, resulting in a zero net change in the overall current through the coils 16 and 28 such that no change is realized in the signal received by the ADC 50. In this respect, it is noted that for the controller 34 to accurately determine the presence or absence of a cooking article A over the detector 40 including detector coils 16 and 28, the net change in current due to the differential arrangement does not have to be exactly zero and that a small change in the current by the influence of external electromagnetic fields may not affect the accuracy of system 10, at least in part due to the magnitude of the difference in the filtered voltages 58*x* and 58*a*, as discussed above. Accordingly, small tolerances in the construction of both the detector coils 16 and 28 and/or the power-delivery induction coil 14, as well as in the positioning of the detector coils 16 and 18 relative to each other and the power-delivery induction coil 14, only have a small effect on the result of the measurement made by the controller 34, making the system 10 also be robust to manufacturing variations.

Figure 6:
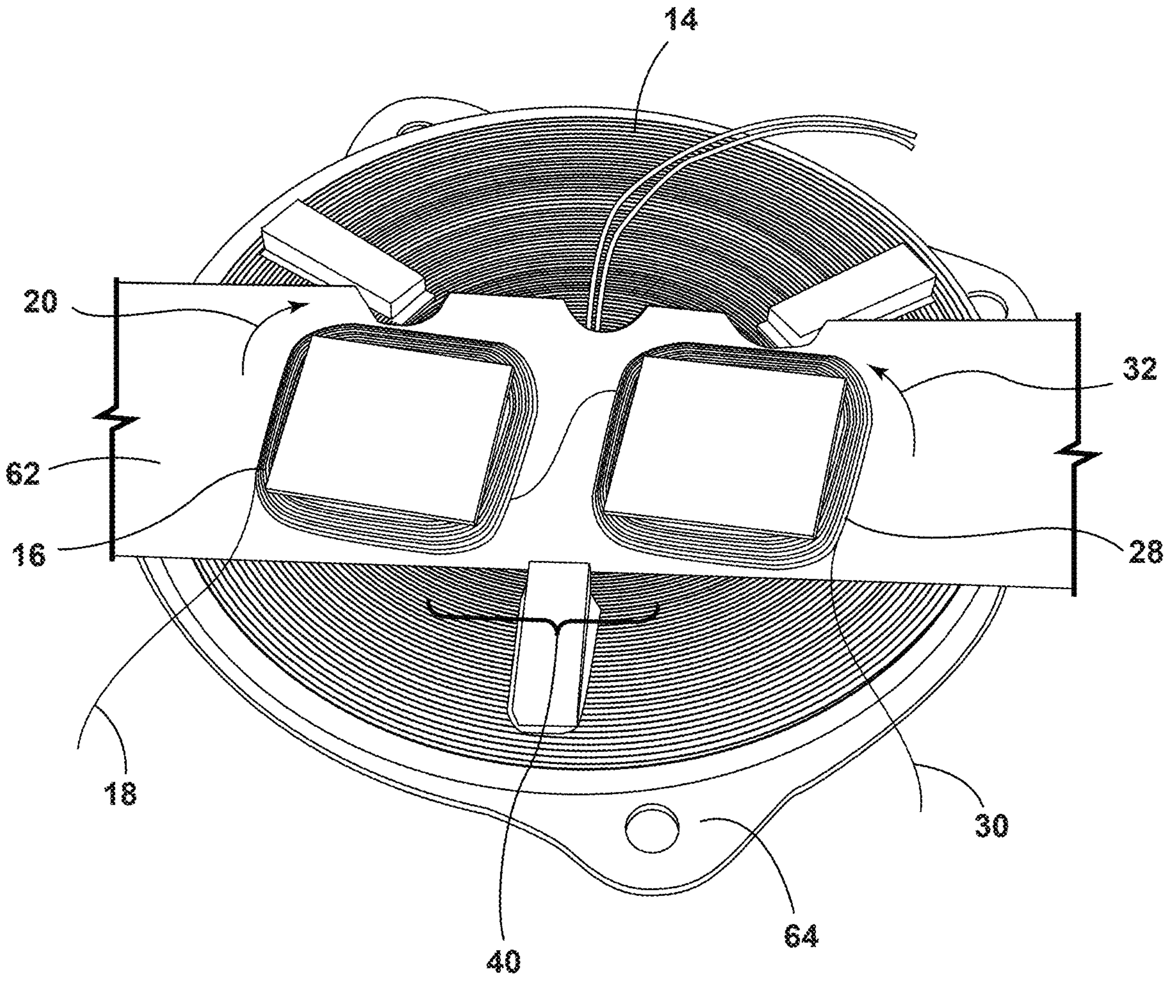
FIG. 6 shows a detector including detector coils in place over a power-delivery induction coil.

The detector coils 16 and 28, as used in the general system 10 described above and shown schematically in FIGS. 3 and 4 can be used in a number of different arrangements for use in associated variations of the described induction cooktop 12. In one implementation, one detector 40 including detector coils 16 and 28 can be used for cooking article A detection operation with one associated power-delivery induction coil 14. As shown in FIG. 6, this arrangement may be used in connection with a circular power-delivery induction coil 14, particularly in connection with a zoned cooktop 12 in which operation of the cooktop 12 is controlled by directly activating and adjusting single power-delivery coils 14 in their own respective zones. As further shown, in such an arrangement, the detector 40 including detector coils 16 and 28 can be mounted over the power-delivery induction coil 14 using a small substrate 62 of a dielectric material coupled with the mounting assembly 64 of the power-delivery induction coil 14.

Figure 7:
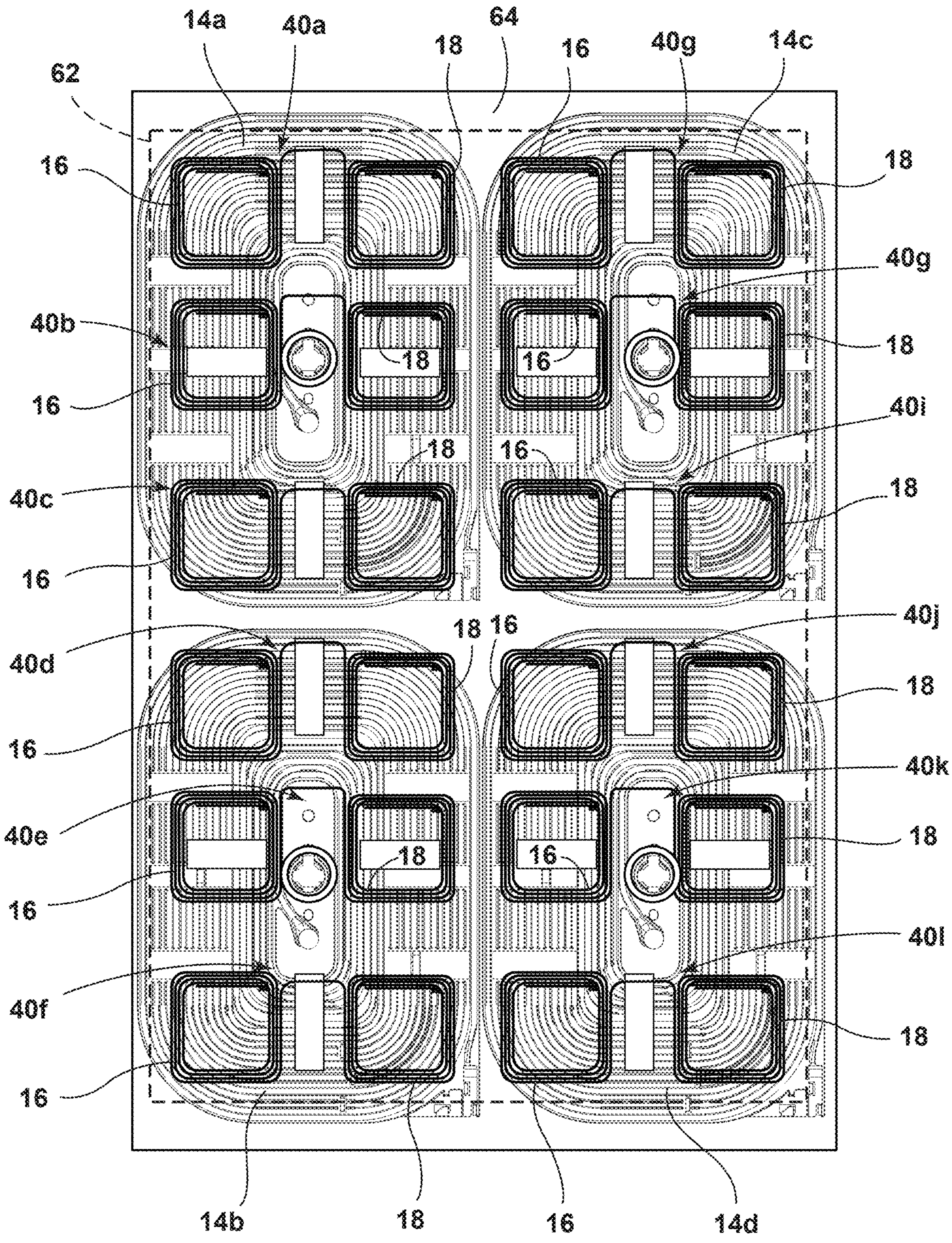
FIG. 7 shows an array of detectors including detector coils over a set of power deliver induction coils in an application of the present system in an example of an induction cooktop.

In a further variation, an example of which is shown in FIG. 7, detectors 40*a*-40*l* including detector coils 16 and 28, as described above, can be distributed over the entire useable area of the cooktop 12. The sizing and distribution of such detectors 40*a*-40*l* can be made to correspond with the particular size of the power-delivery induction coils 14, which are shown in an example form in FIG. 7 as power-delivery induction coils 14*a*-14*d*, but can vary according to factors, including the desired resolution of the resulting detection system. In this arrangement, the detectors 40*a*-40*l* including detector coils 16 and 28 can be mounted on an intermediate substrate 66 of a dielectric material (e.g., a plastic or fabric sheet, or another suitable layer) located between the cooktop substrate 62 and the power-delivery induction coils 14*a*-14*d*. This arrangement can, for example, be used in a "zoneless" arrangement, as discussed above, to determine when a power-delivery induction coil 14*a*-14*d* is partially covered by a detected cooking article A and/or when multiple ones of the power-delivery induction coils 14*a*-14*d* are covered (in whole or in part) by a detected cooking article A. As can be appreciated, such information may be used by controller 34 in determining which power-delivery induction coils 14*a*-14*d* should be activated to heat a detected cooking article A based on its position on a zoneless cooktop 12, as well as for control or calibration of the activated ones of the power-delivery induction coils 14*a*-14*d* to achieve the desired heating level, based on the user-input.

The depicted detectors 40*a*-40*l* including detector coils 16 and 28 can be used in system 10 as discussed above with respect to FIG. 4. In particular, each of the detectors 40*a*-40*l* can be selectively connectable with the controller 34 for driving with the detection signal 52 by the signal source 44 component of the controller 34 and voltage measurement with the ADC 50 by way of the multiplexer 46. The controller 34, being provided with the spatial information of the individual detectors 40*a*-40*l* including detector coils 16 and 28 with respect to the cooktop 12 can control the multiplexer 46 for connection with the individual detectors 40*a*-40*l* in a desired sequence for a selected time interval (either pre-programmed or according to an adaptive process derived and implemented in the controller 34) to detect and spatially locate cooking articles A over the cooktop 12 for association with the appropriate power-delivery induction coils 14*a*-14*d*. In the example shown in FIG. 7, the detectors 40*a*-40*l* including detector coils 16 and 28 are distributed over multiple power-delivery induction coils 14*a*-14*d* with multiple detectors (three in the particular example) 40*a*-40*l* positioned over separate areas of a single one of the power-delivery induction coils 14*a*-14*d*.

More specifically, in the depicted example, the power-delivery induction coils 14*a*-14*d* are generally rectangular in shape with rounded corner areas and are tightly packed together to realize the capability of heating a cooking article A positioned anywhere along the surface 38 of the cooktop substrate 36. The detectors 40*a*-40*l* of the detector coils 16 and 28 are positioned symmetrically over the respective power-delivery induction coils 14*a*-14*d*. More specifically, in the example of power-delivery induction coil 14*a*, three detectors 40*a*, 40*b*, and 40*c* including detector coils 16 and 28 are positioned generally over respective thirds of the length of the rectangular shape of the power-delivery induction coil 14*a* with one detector coil 16 of each detector 40*a*, 40*b*, and 40*c* positioned on one lateral side of the power-delivery induction coil 14*a* (i.e. across the width thereof) and the other detector coil 28 on the opposite lateral side. Other arrangements are possible depending on the shape and relative positioning of various implementations of the power-delivery induction coils 14, as well as the size and detection "range" of the detector coils 16 and 28. As further shown in FIG. 7, the result of the present arrangement is that the detection sensors 16 and 28 across the detectors 40*a*-40*l* are generally evenly arranged across the cooktop substrate 36, although other arrangements are also possible. The depicted arrangement can provide for detection of cooking articles A across the useable area of the cooktop 12 and association of the detected cooking articles A with the underlying power-delivery induction coils 14*a*-14*d* within an acceptable level of accuracy.

The described arrangement and variations thereof according to the principles discussed herein allow the controller 34 to measure the voltage across one detector 40*a*, for example, of the detectors 40*a*-40*l* of detection coils 16 and 28 to identify the cooking article A on the induction cooktop 12 over the associated area (e.g. the rear third) of power-delivery induction coil 14*a* (i.e., by the voltage being below the predetermined threshold value 60, as discussed above) by connection with the detector 40*a* of detection coils 16 and 28 using the multiplexer 46 discussed above. The controller 34 can, in an additional operation, measure the voltage across the detector 40*b* of detection coils 16 and 28 to further identify the same cooking article A or another cooking article A on the induction cooktop 12 over the respective area (e.g. the middle third) of the same power-delivery induction coil 14*a*, again by connection with the detector 40*b* of detection coils 16 and 28 using the multiplexer 46 and by the voltage being below the predetermined threshold value 60. The controller 34 can continue in a similar manner, including with respect to, for example, the detector 40*d* of detection coils 16 and 28 that overlie a different power-delivery induction coil 14*b* with the controller 34 similarly measuring the voltage across the detector 40*d* of detection coils 16 and 28 to identify the same or a different cooking article A on the induction cooktop 12 over power-delivery induction coil 14*b* in a similar manner. In this respect, it is noted that in the process discussed above the identification of the cooking article A may not specifically relate to the cooking article A, such that the system 10 does not inherently differentiate between cooking articles A, but rather may simply detect that any cooking article A is present in any area associated with any of the detectors 40*a*-40*l* including detector coils 16 and 28. In this manner, the controller 34, by effectively scanning through all of the detectors 40*a*-40*l* including detector coils 16 and 28 can develop a map of areas for which a cooking article A is identified as present or absent for use in subsequent or continued control of the power-delivery induction coils 14*a*-14*d*.

The present arrangement, configured according to the description herein, can be used to detect the presence of a cooking article A over generally any portion of either of the detection coils 16 or 28 in a given detector 40. In this respect, the predetermined threshold value 60 for cooking article A detection may be set so as to correspond with the cooking article A being partially over an area of one of the power-delivery induction coils 14 that corresponds with the detector coils 16 and 28 according to a minimum coverage factor. In general, the closer the predetermined threshold value 60 is to the filtered voltage level 58*x* in the absence of a cooking article A, the lower the minimum coverage factor. As can be appreciated, the closeness of the threshold 60 to the filtered voltage level 58*x* in the absence of a cooking article A may adversely affect the accuracy of the system 10 such that the minimum coverage factor may, for example, be advantageously set to at least 10% and in some implementations, at least 25%. In this respect, any detected filtered voltage below the predetermined threshold value 60 can correlate with the coverage factor of the area of the selected detector 40 including detector coils 16 and 28 being higher than the minimum and can be correlated with a voltage associated with a coverage factor of 100% to derive a coverage factor based on the measured voltage. In one example, the measured and filtered voltage 58*a* in the general presence of a cooking article A may be linearly correlated with the coverage factor. In this manner, the continued successive measurements obtained across the array of detectors 40 including detector coils 16 and 28, including multiple ones of such detectors 40 associated with a single power-delivery induction coil 14 and/or across multiple power-delivery induction coils 14 can give a more accurate representation of the location of any cooking articles A with respect to the cooktop 12 and can be used in determining desired operation of the various power-delivery induction coils 14 to heat the identified cooking article(s) A.

Figure 8:
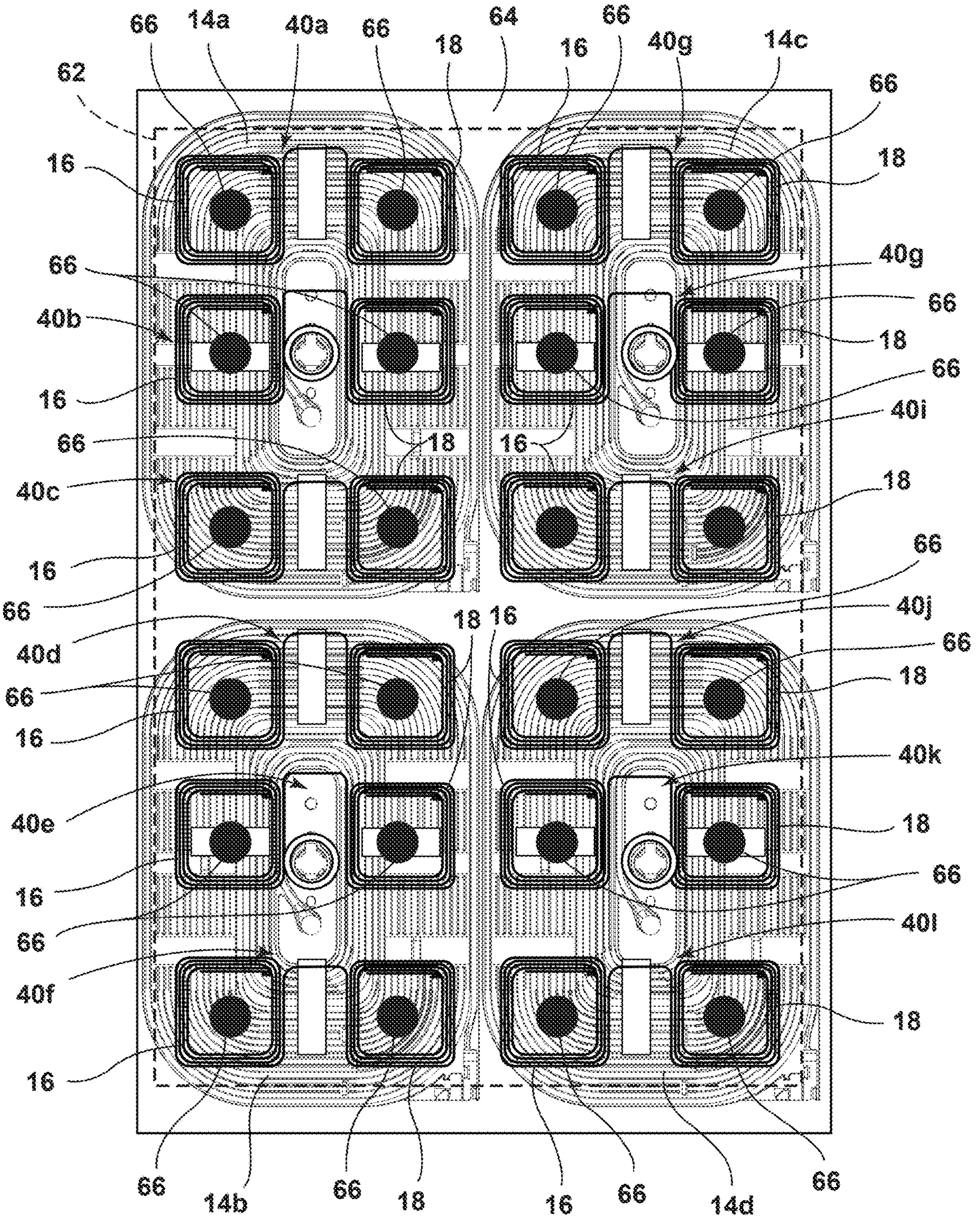
FIG. 8 shows an array of detectors including detector coils with associated temperature sensors over a set of power-delivery induction coils in an application of the present system in an example of an induction cooktop.

As shown in FIG. 8, the system 10 can further include temperature sensors 66 positioned within an interior of the at least some of the detection coils 16 and 28. The temperature sensors can be connected with the controller 34 and associated with the known areas of the detection coils 16 and 28 in which they are included. This can allow the controller 34 to receive respective signals from the various temperature sensors 66 for measuring the temperature associated with the areas of the respective detection coils 16 and 28, including as they relate to the respective areas of the power-delivery induction coils 14 and with the cooktop 12 overall. This information can also be used in various schemes and processes for controlling the power-delivery induction coils 14. More particularly, in certain implementations of cooktops 12, the control systems are configured to deliver power only to the power-delivery induction coil 14 where the temperature of the cooking article A can be monitored. With the arrangement of temperature sensors 66 shown in FIG. 8, a minimum cooking article size can be as low as 60 mm.

The present system 10 can be configured with the ability to measure the inductance L of the detector coils 16 and 28 in association with a particular cooking article A positioned thereover. This can be done by further configuring the controller 34 to vary the frequency of the detection signal 50 within a predetermined range (+/−10%, for example) while measuring the voltage output as discussed above. When the present detector coils 16 and 28 are included in the resonant network of FIG. 4 and as generally discussed herein, the maximum value of the inductance achieved by the detector coils 16 and 28 in the presence of the cooking article A will correlate with the frequency at which the maximum voltage is realized. Such that, for a specific implementation of system 10, the range of frequencies used for this detection can be correlated with the achievable inductance by the detection coils 16 and 28 across an array of operating conditions such that the range of frequencies can be correlated with inductance. This information can be used by system 10 to identify particular cooking articles A and/or for calibration and power-delivery purposes, among other possibilities.

It is to be appreciated that the operation of the system 10, as described above, can be related to or otherwise relate to a method for detecting a cooking article A in place on an induction cooktop 12. More particularly, the method can include simultaneously driving a detector 40 of detection coils 16 and 28, as discussed above with the low-voltage, high frequency detection signal 50 discussed herein and measuring the voltage across the detection coils 16 and 28 to identify a cooking article A on the induction cooktop 12 over the detector including detector coils 16 and 28 by the voltage being below the predetermined threshold value 60. The detection of the cooking article A over the detector 40 including detector coils 16 and 28 can correlate with the area of the cooktop such that the detection can indicate the presence of the cooking article A over the power-delivery induction coil 14 associated with the detector 40 including detector coils 16 and 28. In one aspect, the method may include measuring the voltage across another detector 40 of detection coils 16 and 28 to further identify the same cooking article A or another cooking article A on the induction cooktop 12 over the respective area of the same power-delivery induction coil 14, by connecting with the detector 40 of detection coils 16 and 28 (e.g. by controlling the multiplexer 46) and by driving the detection coils 16 and 28 with the detection signal 50 and determining if the voltage over the detection coils 16 and 28 is below the predetermined threshold value 60.

The method can continue in a similar manner, including with respect to, for example, a still further detector 40 of detection coils 16 and 28 that overlie a different power-delivery induction coil 14 and similarly measuring the voltage across the detector 40 of detection coils 16 and 28, when driven by the detection signal, to identify the same or a different cooking article A on the induction cooktop 12 over power-delivery induction coil 14 in a similar manner.

In this manner, the method can include scanning through all of the detectors 40 including detector coils 16 and 28 associated with the cooktop 12 to develop a map of areas for which a cooking article A is identified as present or absent and using the information from the scanning process in subsequent or continued control of the power-delivery induction coils 14.

The predetermined threshold value used in the method may correspond with the cooking article A being partially over an area of the detector coils 16 and 28 according to a minimum coverage factor, as discussed above. In such an implementation, the method can further include measuring the voltage below the predetermined threshold value 60 to determine the coverage factor of the area of the first power-delivery coil 14 associated with the detector coils 16 and 28 between the minimum coverage factor and a full-coverage factor.

The invention disclosed herein is further summarized in the following paragraphs and is further characterized by combinations of any and all of the various aspects described therein.

According to another aspect of the present disclosure, a cooking article detection system for an induction cooktop having a first power-delivery induction coil includes a first detector coil overlying the first power-delivery induction coil and including a first conductive element revolving continuously around a support in a first tangential direction to define a shape of the first coil that extends in a first linear direction and a second linear direction along a plane and a second detector coil overlying the first power-delivery induction coil and including a second conductive element revolving continuously around a support in a second tangential direction, opposite the first tangential direction, to define a shape of the second coil that extends in the first direction and the second direction along the plane. The second detector coil is linearly arranged with the first detector coil and is spaced apart therefrom in the second linear direction. The system further includes a controller driving the first and second detection coils, simultaneously, with a low-voltage, high frequency detection signal, and measuring a voltage across the first and second detection coils to identify a cooking article on the induction cooktop over the first power-delivery induction coil by the voltage being below a predetermined threshold value.

The first and second detector coils and the controller can be arranged in a resonant circuit with a capacitor, the first and second detector coils providing varying resistance and inductance values for the resonant circuit in the presence and absence of the cooking article over the first power-delivery coil.

The varying resistance and inductance values for the resonant circuit in the presence and absence of the cooking article over the first power-delivery coil, when driven by the detection signal, may cause variation of the voltage across the first and second detection coils to a value below the threshold when the cooking article is present on the induction cooktop over the first power-delivery coil and to a value above the threshold when the cooking article is absent from the induction cooktop over the first power-delivery coil.

The controller may drive the first and second detection coils and measure the voltage across the first and second detection coils to identify the cooking article on the induction cooktop over the first power-delivery induction coil in a detection mode and further operates in a calibration mode, wherein the controller drives the first and second detection coils, simultaneously, with a calibration signal according to a varying frequency, and measuring the voltage across the first and second detection coils to identify a maximum voltage corresponding with a specific frequency of the calibration signal according to the varying frequency and determines an inductance of the resonant circuit based on the maximum voltage and a known capacitance of the capacitor.

The first and second detection coils may be a first detector of detection coils, the cooking article detection system may further include a second detector of detection coils, and the controller may alternately drive a selected one of the first detector of detection coils and the second detector of induction coils with the detection signal and may measure the voltage across the selected one of the first detector of detection coils and the second detector of induction coils.

The second detector of detection coils can overlie the first power-delivery induction coil, the first detector of detection coils can be positioned over a first area of the first power-delivery induction coil, and the second detector of detection coils can be positioned over a first area of the first power-delivery induction coil. The controller can measure the voltage across the first detector of detection coils to identify the cooking article on the induction cooktop over the first area of the first power-delivery induction coil by the voltage being below the predetermined threshold value and can measure the voltage across the second detector of detection coils to identify the cooking article on the induction cooktop over the second area of the first power-delivery induction coil by the voltage being below the predetermined threshold value.

The second detector of detection coils may overlie a second power-delivery induction coil, and the controller can measure the voltage across the second detector of detection coils to identify the cooking article on the induction cooktop over the second power-delivery induction coil by the voltage being below the predetermined threshold value.

The cooking article detection system may further include a multiplexer selectively connecting the first detector of detection coils and the second detector of detection coils with the controller for alternate driving thereby.

The controller may drive the first and second detection coils and measures the voltage across the first and second detection coils to identify a cooking article on the induction cooktop over the first power-delivery induction coil by the voltage being below a predetermined threshold value during operation of the first power-delivery induction coil.

The predetermined threshold value may correspond with the cooking article being partially over an area of the first power-delivery induction coil that corresponds with the first and second detector coils and according to a minimum coverage factor, the controller may further measure the voltage below the predetermined threshold value to determine a coverage factor of the area of the first power-delivery coil between the minimum coverage factor and a full-coverage factor.

The cooking article detection system can further include a first temperature sensor positioned within an interior of the first detection coil and connected with the controller and a second temperature sensor positioned within an interior of the second detection coil and connected with the controller, and the controller may receive a first signal from the first temperature sensor and a second signal from the second temperature sensor in measuring a temperature associated with the first power-delivery induction coil.

According to yet another aspect, an induction cooktop includes a first power-delivery induction coil, a first detector coil overlying the first power-delivery induction coil and including a first conductive element revolving continuously around a support in a first tangential direction to define a shape of the first coil that extends in a first linear direction and a second linear direction along a plane, and a second detector coil overlying the first power-delivery induction coil and including a second conductive element revolving continuously around a support in a second tangential direction, opposite the first tangential direction, to define a shape of the second coil that extends in the first direction and the second direction along the plane. The second detector coil is linearly arranged with the first detector coil and spaced apart therefrom in the second linear direction. The cooktop further includes a controller driving the first and second detection coils, simultaneously, with a low-voltage, high frequency detection signal, and measuring a voltage across the first and second detection coils to identify a cooking article on the induction cooktop over the first power-delivery induction coil by the voltage being below a predetermined threshold value.

The induction cooktop may further include a cooktop substrate having a major surface parallel to the plane and overlying the first power-delivery induction coil, the first detection coil, and the second detection coil, and the controller identifying the cooking article on the induction cooktop over the first power-delivery induction coil may include identifying the cooking article resting on the cooktop substrate and positioned vertically over the first power-delivery induction coil.

The first and second detection coils may be a first detector of detection coils, the cooktop may further include a second detector of detection coils, and the controller may alternately drive a selected one of the first detector of detection coils and the second detector of induction coils with the detection signal and may measure the voltage across the selected one of the first detector of detection coils and the second detector of induction coils.

The second detector of detection coils may overlie the first power-delivery induction coil, the first detector of detection coils may be positioned over a first area of the first power-delivery induction coil, and the second detector of detection coils may be positioned over a second area of the first power-delivery induction coil. The controller may measure the voltage across the first detector of detection coils to identify the cooking article on the induction cooktop over the first area of the first power-delivery induction coil by the voltage being below the predetermined threshold value and may measure the voltage across the second detector of detection coils to identify the cooking article on the induction cooktop over the second area of the first power-delivery induction coil by the voltage being below the predetermined threshold value.

The induction cooktop may further include a second power-delivery induction coil, the second detector of detection coils may overlie the second power-delivery induction coil, and the controller may measure the voltage across the second detector of detection coils to identify the cooking article on the induction cooktop over the second power-delivery induction coil by the voltage being below the predetermined threshold value.

According to yet another aspect, a method for detecting a cooking article in place on an induction cooktop having a first power-delivery induction coil including driving a first detection coil and second detection coils, simultaneously, with a low-voltage, high frequency detection signal. The first detector coil overlies the first power-delivery induction coil and includes a first conductive element revolving continuously around a support in a first tangential direction to define a shape of the first coil that extends in a first linear direction and a second linear direction along a plane. The second detector coil overlies the first power-delivery induction coil and includes a second conductive element revolving continuously around a support in a second tangential direction, opposite the first tangential direction, to define a shape of the second coil that extends in the first direction and the second direction along the plane. The second tangential direction is linearly arranged with the first detector coil and spaced apart therefrom in the second linear direction. The method further includes measuring a voltage across the first and second detection coils, to identify a cooking article on the induction cooktop over the first power-delivery induction coil by the voltage being below a predetermined threshold value.

The method may further include operating the first power-delivery induction coil, by providing an operating voltage thereto, simultaneously with driving the first and second detection coils and measuring the voltage across the first and second detection coils to identify a cooking article on the induction cooktop over the first power-delivery induction coil by the voltage being below a predetermined threshold value.

The first and second detector coils may be arranged in a resonant circuit with a capacitor and a power source for driving the first and second detector coils, driving the first and second detector coils, simultaneously, with the detection signal producing varying resistance and inductance values for the resonant circuit in the presence and absence of the cooking article over the first power-delivery coil, and the varying resistance and inductance values for the resonant circuit in the presence and absence of the cooking article over the first power-delivery coil, when driven by the detection signal, causes variation of the voltage across the first and second detection coils to a value below the threshold when the cooking article is present on the induction cooktop over the first power-delivery coil and to a value above the threshold cooking article is absent from the induction cooktop over the first power-delivery coil.

The predetermined threshold value may correspond with the cooking article being partially over an area of the first power-delivery induction coil corresponding with the first and second detector coils and according to a minimum coverage factor, and measuring the voltage may include measuring the voltage below the predetermined threshold value to determine a coverage factor of the area of the first power-delivery coil between the minimum coverage factor and a full-coverage factor.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking article detection system for an induction cooktop including a first power-delivery induction coil, comprising:

a first detector coil overlying the first power-delivery induction coil and including a first conductive element revolving continuously around a first centroid in a first tangential direction to define a shape of the first detector coil that extends in a first linear direction and a second linear direction along a first plane;

a second detector coil overlying the first power-delivery induction coil and including a second conductive element connected with the first conductive element and revolving continuously around a second centroid in a second tangential direction, opposite the first tangential direction, to define a shape of the second detector coil that extends in the first direction and the second direction along the first plane, the second detector coil being linearly arranged with the first detector coil and spaced apart therefrom in the second linear direction; and a controller driving the first and second detection coils, simultaneously, with a low-voltage, high frequency detection signal, and measuring a voltage across both of the first and second detection coils to identify a cooking article on the induction cooktop at least partially positioned over the first power-delivery induction coil by the voltage being below a predetermined threshold value, wherein the controller simultaneously drives the first and second detection coils and measures the voltage across both the first and second detection coils to identify the cooking article on the induction cooktop over the first power-delivery induction coil by the voltage being below the predetermined threshold value during operation of the first power-delivery induction coil.

2. The detection system of claim 1, wherein:

the detection signal causes the first and second detector coils provide varying resistance and inductance values in the presence and absence of the cooking article over the first power-delivery coil; and the varying resistance and inductance values cause corresponding variations in the voltage across the first and second detection coils to a value below the threshold when the cooking article is present on the induction cooktop over the first power-delivery coil and to a value above the threshold when the cooking article is absent from the induction cooktop over the first power-delivery coil.

3. The detection system of claim 2, wherein:

the first and second detector coils and the controller are arranged in a resonant circuit with a capacitor; and the controller measures the voltage across the first and second detection coils by connection with an output of the resonant circuit.

4. The detection system of claim 3, wherein:

the controller driving the first and second detection coils with the detection signal further includes imparting a varied frequency in the detection signal; and the controller measuring the voltage across the first and second detection coils further includes identifying a maximum voltage corresponding with a specific frequency of the detection signal according to the varied frequency and determining an inductance of the resonant circuit based on the maximum voltage and a known capacitance of the capacitor.

5. The detection system of claim 1, wherein:

the first and second detection coils define a first detector, the cooking article detection system further including a second detector including third and fourth detection coils; and the controller alternately drives a selected one of the first detector and the second detector with the detection signal and measures the voltage across the selected one of the first detector and the second detector.

6. The detection system of claim 5, wherein:

the second detector overlies the first power-delivery induction coil;

the first detector is positioned over a first area of the first power-delivery induction coil, and the second detector is positioned over a second area of the first power-delivery induction coil; and the controller measures the voltage across the first detector to identify the cooking article on the induction cooktop over the first area of the first power-delivery induction coil by the voltage being below the predetermined threshold value and measures the voltage across the second detector to identify the cooking article on the induction cooktop over the second area of the first power-delivery induction coil by the voltage being below the predetermined threshold value.

7. The detection system of claim 5, wherein:

the second detector overlie a second power-delivery induction coil; and the controller measures the voltage across the second detector to identify the cooking article on the induction cooktop over the second power-delivery induction coil by the voltage being below the predetermined threshold value.

8. The detection system of claim 6, further including a multiplexer selectively connecting the first detector and the second detector with the controller for alternate driving thereby.

9. The detection system of claim 1, wherein the predetermined threshold value corresponds with the cooking article being partially over an area of the first power-delivery induction coil corresponding with the first and second detector coils and according to a minimum coverage factor, the controller further measuring the voltage below the predetermined threshold value to determine a coverage factor of the area of the first power-delivery coil between the minimum coverage factor and a full-coverage factor.

10. The detection system of claim 1, further including:

a first temperature sensor positioned within an interior of the first detection coil and connected with the controller; and a second temperature sensor positioned within an interior of the second detection coil and connected with the controller; wherein:

the controller receives a first signal from the first temperature sensor and a second signal from the second temperature sensor in measuring a temperature associated with the first power-delivery induction coil.

11. An induction cooktop, including:

a first power-delivery induction coil;

a first detector including:

a first detector coil overlying the first power-delivery induction coil and including a first conductive element revolving continuously around a first centroid in a first tangential direction to define a shape of the first detector coil that extends in a first linear direction and a second linear direction along a first plane; and a second detector coil overlying the first power-delivery induction coil and including a second conductive element connected with the first conductive element and revolving continuously around a second centroid in a second tangential direction, opposite the first tangential direction, to define a shape of the second detector coil that extends in the first direction and the second direction along the first plane, the second detector coil being linearly arranged with the first detector coil and spaced apart therefrom in the second linear direction;

a second detector having third and fourth detection coils; and a controller alternately driving a selected one of the first detector and the second detector with the detection signal and measures the voltage across the selected one of the first detector and the second detectors, wherein driving the first detector includes driving the first and second detection coils, simultaneously, with a low-voltage, high frequency detection signal, and measuring a voltage across the first and second detection coils to identify a cooking article on the induction cooktop over the first power-delivery induction coil by the voltage being below a predetermined threshold value.

12. The induction cooktop of claim 11, further including a cooktop substrate having a major surface parallel to the plane and overlying the first power-delivery induction coil, the first detection coil, and the second detection coil, wherein:

the controller identifying the cooking article on the induction cooktop over the first power-delivery induction coil includes identifying the cooking article resting on the cooktop substrate and positioned vertically over the first power-delivery induction coil.

13. The induction cooktop of claim 11, wherein:

the second detector overlies the first power-delivery induction coil;

the first detector is positioned over a first area of the first power-delivery induction coil, and the second detector of detection coils are positioned over a second area of the first power-delivery induction coil; and the controller measures the voltage across the first detector to identify the cooking article on the induction cooktop over the first area of the first power-delivery induction coil by the voltage being below the predetermined threshold value and measures the voltage across the second detector to identify the cooking article on the induction cooktop over the second area of the first power-delivery induction coil by the voltage being below the predetermined threshold value.

14. The induction cooktop of claim 11, further including a second power-delivery induction coil, wherein:

the second detector overlies the second power-delivery induction coil; and the controller measures the voltage across the second detector to identify the cooking article on the induction cooktop over the second power-delivery induction coil by the voltage being below the predetermined threshold value.

15. A method for detecting a cooking article in place on an induction cooktop including a first power-delivery induction coil, comprising:

driving a first detection coil and second detection coil, simultaneously, with a low-voltage, high frequency detection signal, the first detector coil overlying the first power-delivery induction coil and including a first conductive element revolving continuously around a first centroid in a first tangential direction to define a shape of the first coil that extends in a first linear direction and a second linear direction along a first plane, and the second detector coil overlying the first power-delivery induction coil and including a second conductive element connected with the first conductive element and revolving continuously around a second centroid in a second tangential direction, opposite the first tangential direction, to define a shape of the second coil that extends in the first direction and the second direction along the first plane, the second detector coil being linearly arranged with the first detector coil and spaced apart therefrom in the second linear direction; and operating the first power-delivery induction coil, by providing an operating voltage thereto, simultaneously with driving the first and second detection coils and simultaneously measuring a voltage across the first and second detection coils, to identify a cooking article on the induction cooktop over the first power-delivery induction coil by the voltage being below a predetermined threshold value.

16. The method of claim 15, wherein:

the first and second detector coils are arranged in a resonant circuit with a capacitor and a power source for driving the first and second detector coils;

driving the first and second detector coils, simultaneously, with the detection signal results in varying resistance and inductance values for the resonant circuit in the presence and absence of the cooking article over the first power-delivery coil; and the varying resistance and inductance values for the resonant circuit in the presence and absence of the cooking article over the first power-delivery coil, when driven by the detection signal, causes variation of in the voltage across the first and second detection coils to a value below the threshold when the cooking article is present on the induction cooktop over the first power-delivery coil and to a value above the threshold cooking article is absent from the induction cooktop over the first power-delivery coil.

17. The method of claim 15, wherein:

the predetermined threshold value corresponds with the cooking article being partially over an area of the first power-delivery induction coil corresponding with the first and second detector coils and according to a minimum coverage factor; and measuring the voltage includes measuring the voltage below the predetermined threshold value to determine a coverage factor of the area of the first power-delivery coil between the minimum coverage factor and a full-coverage factor.

* * * * *